(12) United States Patent
Ito (10) Patent No.: US 11,060,974 B2
(45) Date of Patent: Jul. 13, 2021

(54) ANALYZING DEVICE AND FLOW PATH PLATE

(71) Applicant: ALPS ALPINE CO., LTD., Tokyo (JP)

(72) Inventor: Junko Ito, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 0 days.

(21) Appl. No.: 16/737,204

(22) Filed: Jan. 8, 2020

(65) Prior Publication Data
US 2020/0141867 A1 May 7, 2020

Related U.S. Application Data

(63) Continuation of application No. PCT/JP2018/025488, filed on Jul. 5, 2018.

(30) Foreign Application Priority Data

Jul. 12, 2017 (JP) .............................. JP2017-136157

(51) Int. Cl.
*G01N 21/59* (2006.01)
*G01N 30/74* (2006.01)
*G01N 30/60* (2006.01)
*G01N 21/85* (2006.01)

(52) U.S. Cl.
CPC ............. *G01N 21/59* (2013.01); *G01N 21/85* (2013.01); *G01N 30/60* (2013.01); *G01N 30/74* (2013.01); *G01N 2201/068* (2013.01)

(58) Field of Classification Search
CPC ........ G01N 21/59; G01N 21/85; G01N 30/60; G01N 30/74; G01N 2201/068
See application file for complete search history.

(56) References Cited

U.S. PATENT DOCUMENTS 5,057,216 A * 10/1991 Chervet ................. G01N 21/05
210/198.2
9,995,673 B2    6/2018 Gunji
(Continued)

FOREIGN PATENT DOCUMENTS

JP      2002-267597     9/2002
JP      2004-340636    12/2004
(Continued)

OTHER PUBLICATIONS

International Search Report for PCT/JP2018/025488 dated Sep. 25, 2018.

*Primary Examiner* — Jamil Ahmed
(74) *Attorney, Agent, or Firm* — IPUSA, PLLC (57) ABSTRACT

An analyzing device includes a flow path plate having a flow path, through which a liquid flows, shaped like a rectangle, and having a light permeability, a light emitting unit having a light emitting lens and emitting light, and a light receiving unit including a light receiving lens and receiving the light, the analyzing device analyzing the liquid flowing inside the flow path plate, wherein the flow path plate has a pair of cutouts formed at an end face so as to face each other through a part of the flow path, wherein the pair of cutouts includes a first cutout in which the light emitting unit is disposed and a second cutout in which the light receiving unit is disposed.

7 Claims, 10 Drawing Sheets

(56) References Cited

U.S. PATENT DOCUMENTS

| | | | |
|---|---|---|---|
| 2007/0041009 A1* | 2/2007 | Iwano | G01N 30/74 |
| | | | 356/246 |
| 2013/0161243 A1 | 6/2013 | Kanomata et al. | |
| 2013/0164854 A1 | 6/2013 | Wang et al. | |
| 2014/0042066 A1 | 2/2014 | Ito et al. | |
| 2014/0219870 A1 | 8/2014 | Ryu | |
| 2016/0069803 A1 | 3/2016 | Sano et al. | |
| 2016/0282317 A1* | 9/2016 | Gunji | G01N 21/05 |
| 2018/0100836 A1 | 4/2018 | Suzuki et al. | |

FOREIGN PATENT DOCUMENTS

| | | |
|---|---|---|
| JP | 2012-063159 | 3/2012 |
| JP | 2013-122397 | 6/2013 |
| JP | 2014-035317 | 2/2014 |
| JP | 2014-521110 | 8/2014 |
| JP | 2016-038321 | 3/2016 |
| JP | 2016-180728 | 10/2016 |
| JP | 2017-003562 | 1/2017 |
| WO | 2006/004176 | 1/2006 |
| WO | 2014/170985 | 10/2014 |

* cited by examiner

ANALYZING DEVICE AND FLOW PATH PLATE

CROSS-REFERENCE TO RELATED APPLICATION

The present application is a continuation application of International Application No. PCT/JP2018/025488, filed Jul. 5, 2018, which claims priority to Japanese Patent Application No. 2017-136157, filed Jul. 12, 2017. The contents of these applications are incorporated herein by reference in their entirety.

BACKGROUND OF THE INVENTION

1. Field of the Invention

The present invention relates to an analyzing device and a flow path plate.

2. Description of the Related Art

There is an analyzing device that uses a flow path plate (also called a flow path tip) to analyze trace substances, such as proteins and nucleic acids, contained in body fluids (blood or liquids secreted or excreted inside or outside the body (including sweat and saliva) and chemicals contained in effluent discharged from factories.

The flow path plate requires a small amount of sample and reagent for analysis and can be analyzed accurately and in a short time. Therefore, the flow path plates are expected to be used in a variety of applications, such as laboratory tests, food tests, or environmental tests. In recent years, it is particularly expected to be used in point-of-care testing (POCT), which is a simple and prompt examination in medical practice such as medical care and nursing.

A flow path unit is disclosed as a flow path plate including, for example, a column for liquid chromatography and a support for supporting a column (see, for example, Patent Document 1). The flow path unit includes a support body made of a first plate and a second plate. The first and second plates are laminated so as to form a column retaining portion and a flow path, and a liquid inlet and outlet are provided on the front surface of the first plate.

When analyzing the liquid to be measured, the flow path unit is inserted into the analyzing device, and when liquid is injected into the flow path unit, the components in the liquid are separated by the flow path unit. The liquid flowing out of the flow path unit is then fed to the flow cell to which the light from the light source is illuminated. The liquid is analyzed by detecting light passing through the flow cell and calculating the absorbance absorbed by the component in the liquid (see, for example, Patent Document 2).
[Patent Document 1]
Japanese Laid-Open Patent Application No. 2017-3562
[Patent Document 2]
Japanese Laid-Open Patent Application No. 2016-180728

However, in a conventional analyzing device, various types of samples are analyzed as the fluid to be analyzed, so that each time the analyzing device analyzes the liquid, it is necessary to sufficiently wash the flow cell in advance with a wash solution or the like so that the analysis will not be affected.

In addition, when it became difficult to reuse the flow cell due to the inability to completely remove dirt in the flow cell even after cleaning the flow cell, the flow cell was replaced. When replacing the flow cell, it took a long time to replace the flow cell because of the need to precisely align the optical components in the main body of the analyzing device with the new flow cell.

SUMMARY OF THE INVENTION

An analyzing device according to this disclosure includes a flow path plate having a flow path, through which a liquid flows, shaped like a rectangle, and having a light permeability, a light emitting unit having a light emitting lens and emitting light, and a light receiving unit including a light receiving lens and receiving the light, the analyzing device analyzing the liquid flowing inside the flow path plate, wherein the flow path plate has a pair of cutouts formed at an end face so as to face each other through a part of the flow path, wherein the pair of cutouts includes a first cutout in which the light emitting unit is disposed and a second cutout in which the light receiving unit is disposed.

DETAILED DESCRIPTION OF THE PREFERRED EMBODIMENTS

Hereinafter, embodiments of the present invention will be described in detail. For ease of comprehension, the scale of each member in the drawings may differ from the actual scale. In the following description, one of the height directions of the analyzing device is referred to as high, up, or upward, and the other of the height direction of the analyzing device is referred to as low, down, or downward. In this specification, the three-dimensional orthogonal coordinate system using three axes (X-axis direction, Y-axis direction, and Z-axis direction) are used. The width direction of the analyzing device is set to the X direction, the depth direction is set to the Y direction, and the height direction is set to the Z direction.

Figure 1:
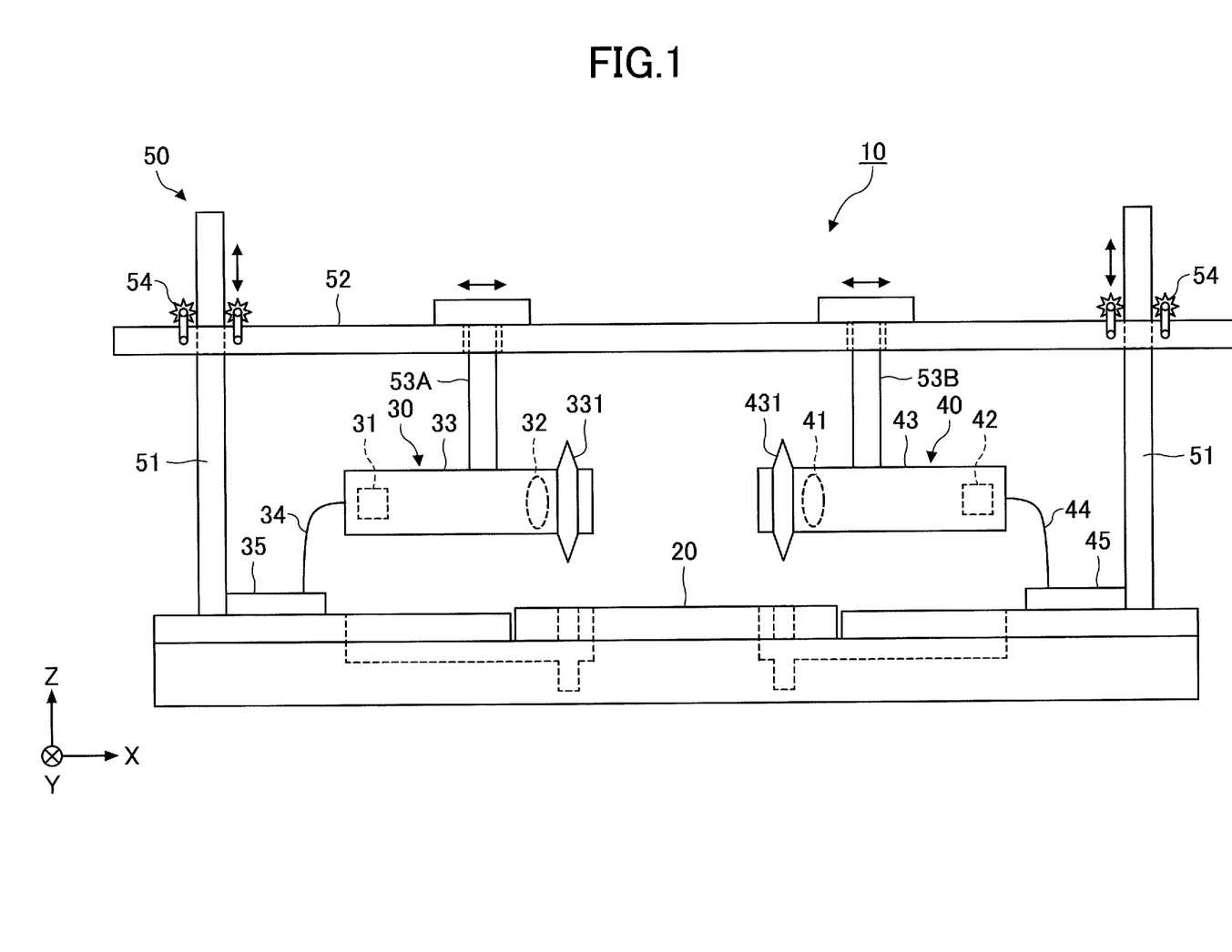
FIG. 1 schematically illustrates an analyzing device with a flow path plate according to an embodiment.

<Analyzing Device>
An analyzing device according to the embodiment will be described. FIG. 1 is a schematic diagram illustrating an analyzing device with a flow path chip according to an embodiment. As illustrated in FIG. 1, the analyzing device 10 according to the embodiment includes the flow path plate 20, a light emitting unit 30, a light receiving unit 40, and a drive unit 50 for analyzing the liquid to be inspected. FIG.

1 illustrates the analyzing device 10 in a state in which the light emitting unit 30 and the light receiving unit 40 are not mounted to the flow path plate 20. The fluid (sample) to be examined may be, for example, a substance of biological origin (e.g., blood, sweat, saliva, or urine), a synthesized chemical (e.g., pesticide, pharmaceutical, or food additive), or an environmentally hazardous substance (e.g., wastewater, waste liquid, or groundwater).

Figure 2:
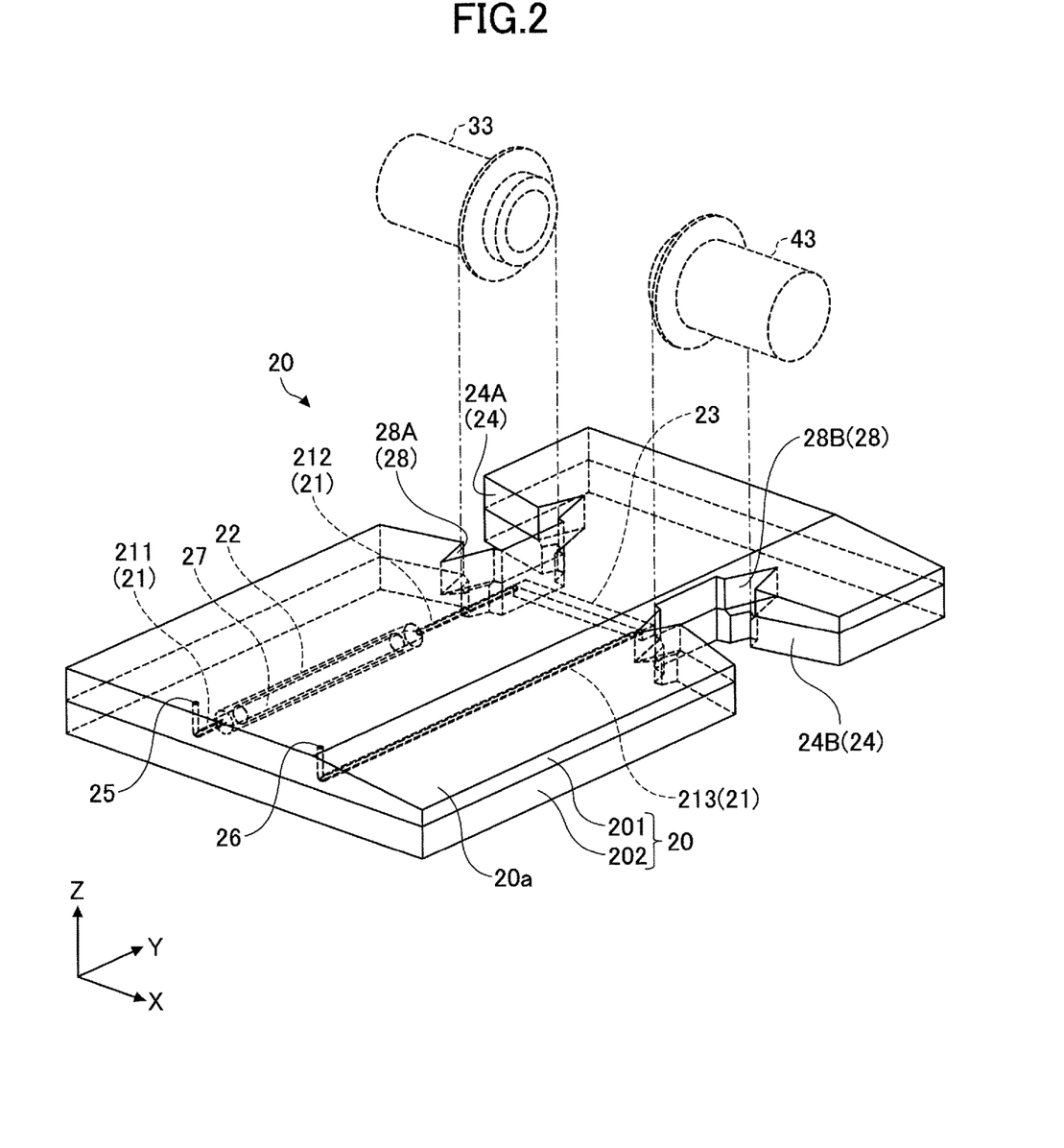
FIG. 2 is a perspective view of the flow path plate.
Figure 3:
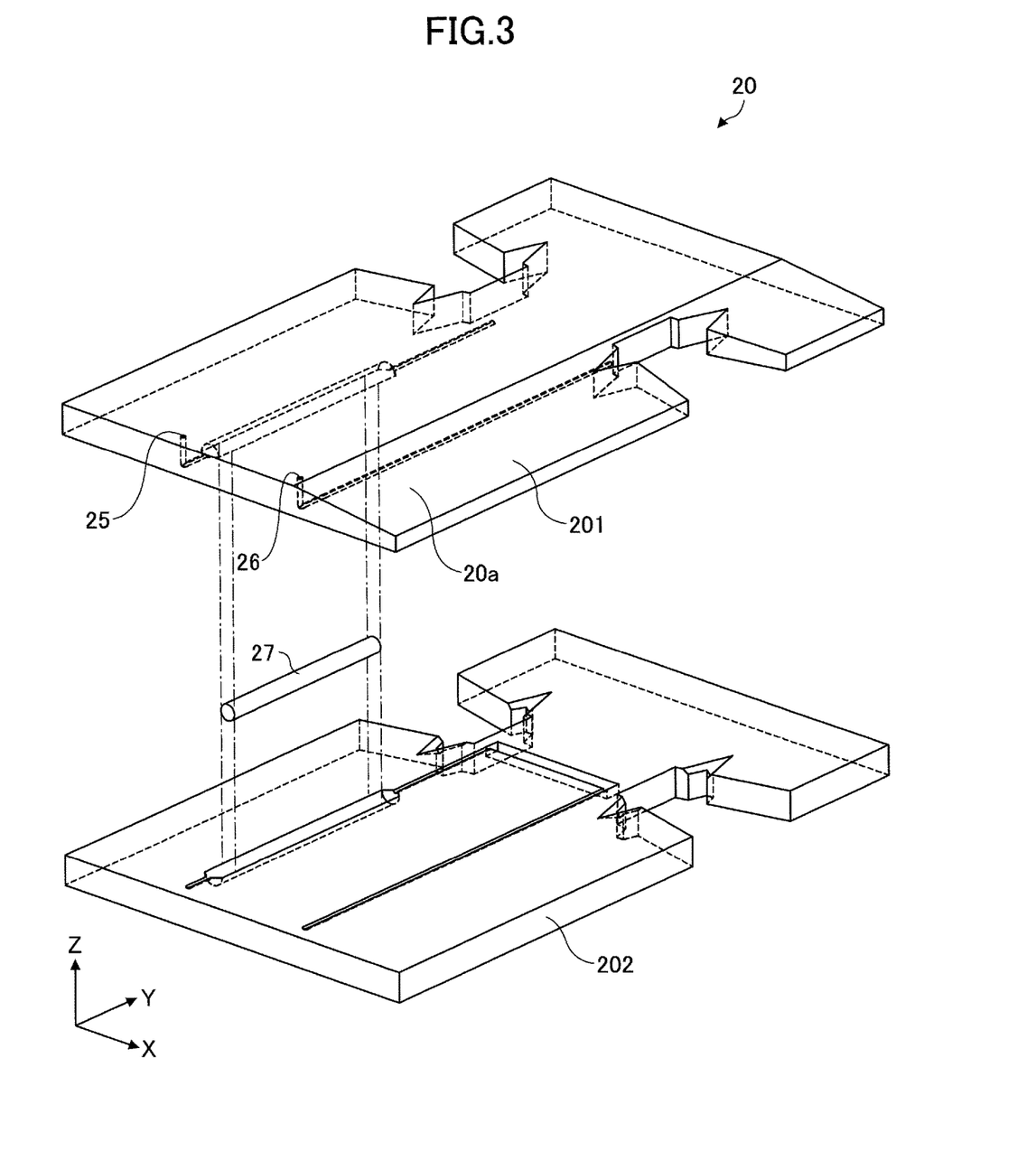
FIG. 3 is an exploded perspective view of the flow path plate.
Figure 4:
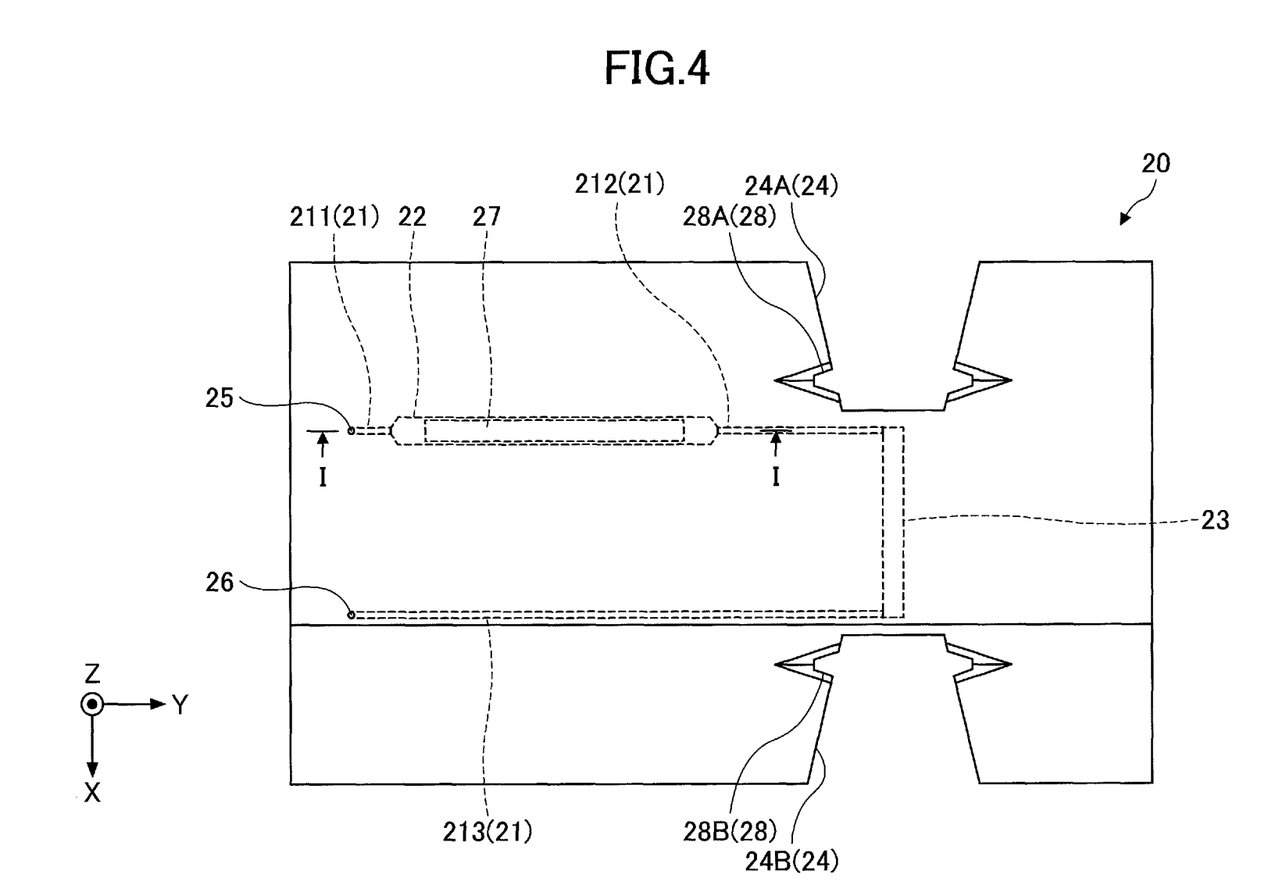
FIG. 4 is a plan view of the flow path plate.
Figure 5:
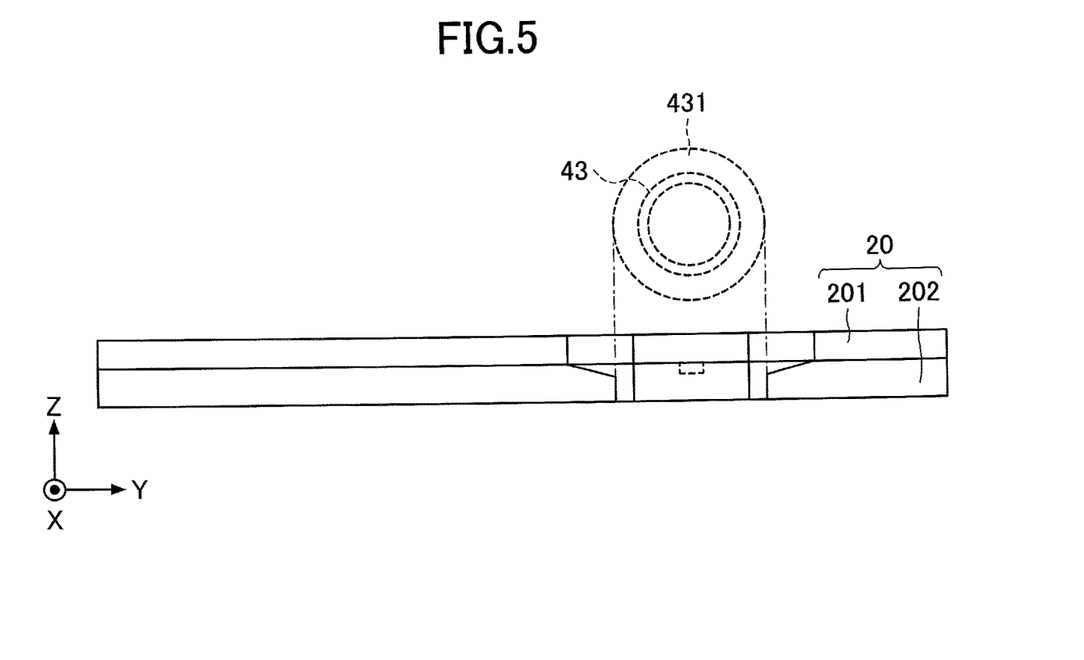
FIG. 5 is a front view of the flow path plate.

The flow path plate 20 will be described. FIG. 2 is a perspective view of the flow path plate 20, FIG. 3 is an exploded perspective view of the flow path plate 20. FIG. 4 is a plan view of the flow path plate 20, and FIG. 5 is a front view of the flow path plate 20. As illustrated in FIGS. 2-5, the flow path plate 20 is famed in a rectangular shape and has a light permeability in a plan view. The flow path plate 20 includes a plate-like first plate 201 and a plate-like second plate 202 formed by laminating the first plate 201 and the second plate 202 in a thickness-oriented manner.

The first plate 201 and the second plate 202 are made of material having a light permeability. Examples of such materials include acrylic resins, cycloolefin resins, polyester resins, and the like. In particular, it is preferable to use a cycloolefin resin from the viewpoint of chemical resistance.

The first plate 201 and the second plate 202 are bonded together, for example by thermocompression bonding. The first plate 201 and the second plate 202 may also be bonded using an adhesive such as an ultraviolet curing resin.

The flow path plate 20 has a liquid flow path 21, a separation element housing 22, an optical detection cell 23, and a pair of cutouts 24. The liquid flow path 21, the separation element housing 22, and the optical detection cell 23 are provided inside the flow path plate 20, and the separation element housing 22 and the optical detection cell 23 are provided in the middle of the liquid flow path 21.

The first plate 201 and the second plate 202, which form the liquid flow path 21 and the separation element housing 22, are formed with a recess or hole in the shape corresponding to the liquid flow path 21 and the separation element housing 22. The recessed portion of the first plate 201 and the recessed portion of the second plate 202 are symmetrically formed in the vertical and horizontal directions as viewed from the center line of the recessed portions. The second plate 202 is formed with the recessed portion having a shape corresponding to the optical detection cell 23. Therefore, the liquid flow path 21, the separation element housing 22, and the optical detection cell 23 are formed after bonding the first plate 201 and the second plate 202.

The liquid flow path 21 is a passage through which liquid passes through the flow path plate 20. The inlet 25 and outlet 26 of the liquid flow path 21 are provided on a principal surface of the first plate 201. The inlet 25 and outlet 26 are provided opposite to the-Y-axis end face of the principal surface of the first plate 201. The inlet 25 and outlet 26, respectively, are generally circularly formed in a plane view, as illustrated in FIG. 4.

The liquid flow path 21 includes a first liquid flow path 211 connecting an inlet 25 and a separation element housing 22, a second liquid flow path 212 connecting a separation element housing 22 and an optical detection cell 23, and a third liquid flow path 213 connecting an optical detection cell 23 and an outlet 26. The liquid flow path 21 is generally U-shaped from an inlet 25 to an outlet 26 through a separation element housing 22 and an optical detection cell 23 in the liquid flow path 21 in a plan view of the flow path plate 20. That is, the liquid flow path 21 has a folding structure from the inlet 25 to the outlet 26 through the optical detection cell 23 in the plan view of the flow path plate 20.

The first liquid flow path 211 extends from the inlet 25 toward the second plate 202 and bends at the interface between the first plate 201 and the second plate 202 to communicate with the separation element housing 22.

The second liquid flow path 212 extends from the separation element housing 22 in a longitudinal direction (+Y-axis direction) of the flow path plate 20 along the boundary between the first plate 201 and the second plate 202 and communicates with the optical detection cell 23.

The third liquid flow path 213 extends from the optical detection cell 23 in a longitudinal direction (−Y-axis direction) of the flow path plate 20 along the boundary between the first plate 201 and the second plate 202, bends halfway, extends to the principal surface of the first plate 201, and communicates with the outlet 26.

The separation element housing 22 is the space that houses the separation column (separation element) 27 for liquid chromatography. The separation element housing 22 is provided on the upstream side of the liquid flowing through the liquid flow path 21 from the optical detection cell 23.

Figure 6:
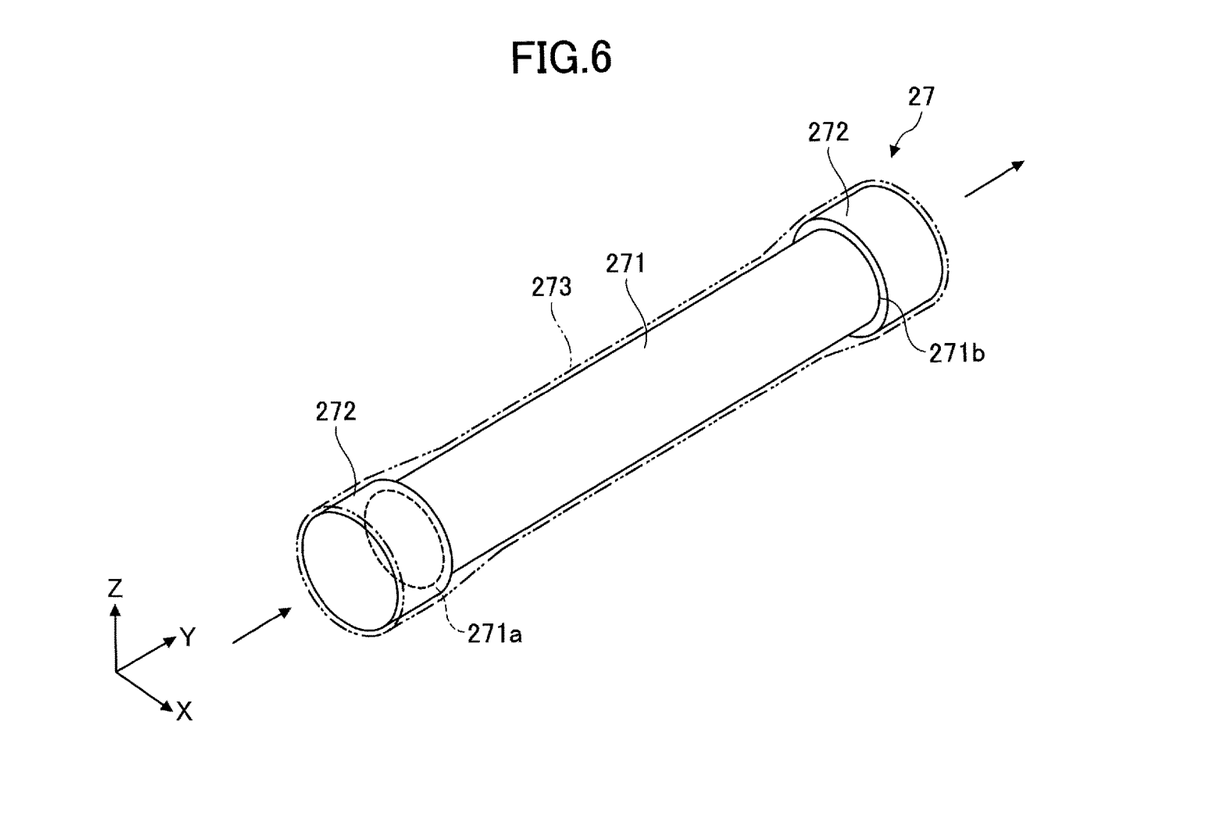
FIG. 6 is a perspective view of a separation column.
Figure 7:
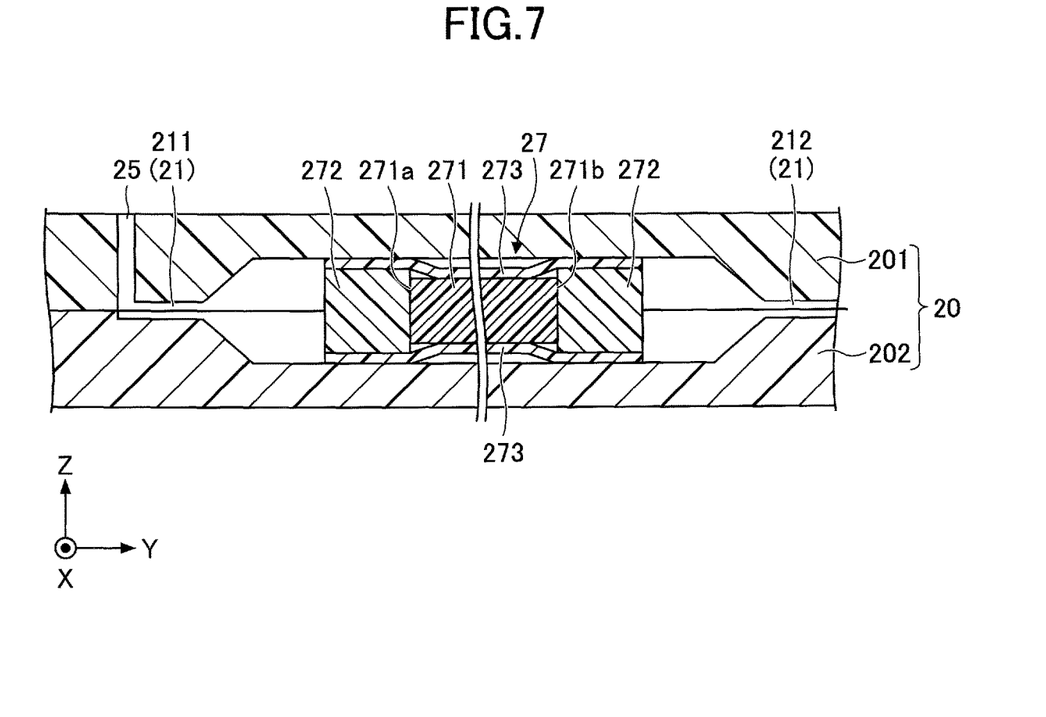
FIG. 7 is an enlarged cross-sectional view of the separation column of the I-I cross-section of FIG. 4.

The separation columns 27 are disposed within the separation element housing 22 and sandwiched between the first plate 201 and the second plate 202. An example of the separation column 27 is illustrated in FIG. 6. FIG. 6 is an enlarged cross-sectional view of the separation column 27 of the I-I cross section of FIG. 4. In FIG. 6, the coating 273 is illustrated as a dotted line for convenience of illustration. As illustrated in FIGS. 6 and 7, the separation column 27 has a stationary phase 271, a pressure regulator 272 provided on both the entry end 271a and exit end 271b of the stationary phase 271, and a coating 273 covering the stationary phase 271 and pressure regulator 272.

The stationary phase 271 is formed like a column. The stationary phase 271 has the function of separating components from each other by interactions (e.g., hydrophobic interactions, ion exchange, etc.) with each component of the liquid passing through the stationary phase 271. The stationary phase 271 is famed of porous bodies or aggregates of fine particles. The material of the stationary phase 271 is selected from a variety of ceramics, macromolecules, and the like, depending on the type of liquid and the type of components to be separated. In this embodiment, the stationary phase 271 includes sintered ceramics of monolithic construction. Examples of sintered ceramics include porous silicas. In particular, silicamonolith formed entirely from an integral silica gel are used.

The pressure regulator 272 is famed like a column. The outer diameter of the pressure regulator 272 is formed to be larger than the outer diameter of the stationary phase 271. The pressure regulator 272 functions to regulate the flow of liquid. The pressure regulator 272 may be formed, for example, of a porous body. As the material forming the pressure regulator 272, known ceramics, polymers, or the like can be used. The pressure regulator 272 is provided at both ends of the stationary phase 271 to regulate the flow of liquid entering the stationary phase 271 and flowing out of the separation column 27 to suppress disturbances of liquid passing through the stationary phase 271 and liquid flowing out of the separation column 27.

The coating 273 is formed in a tubular shape. The coating 273 may be made, for example, of a heat shrinking resin that shrinks upon heating. The type of heat shrinkable resin is not particularly limited. Examples of heat shrinkable resins include tetrafluoroethylene-hexafluoropropylene copolymer (FEP), polyether ether ketone (PEEK), and the like. In particular, it is preferable to use PEEK in order to stably coat the stationary phase 271 by preventing gaps between the stationary phase 271 and the coating 273.

Thus, the stationary phase 271 and the pressure regulator 272 are housed within a coating 273 and heated to form a separation column 27.

The separation columns 27 are housed within the separation element houses 22 sandwiched between the first and second plates 201 and 202 that form the separation element houses 22. In particular, because the outer diameter of the pressure regulator 272 is larger than the outer diameter of the stationary phase 271, the pressure regulator 272 receives greater pressure from the first plate 201 and the second plate 202 than the stationary phase 271. Therefore, because the adhesion between the first plate 201 and the second plate 202 and the pressure regulator 272 can be increased, the pressure resistance when the liquid is supplied can be improved. The stationary phase 271 can also be relieved from being subjected to excessive pressure from the first plate 201 and the second plate 202. Therefore, the porous pores of the stationary phase 271 can be prevented from collapsing, thereby preventing the flow of liquid through the stationary phase 271 from being obstructed.

Next, the structure of the optical detection cell 23 and a pair of cutouts 24 will be described with reference to FIGS. 2 to 5.

The optical detection cell 23 is a space in which light is irradiated from the light emitting unit 30. The optical detection cell 23 is provided in a portion of the liquid flow path 21 (between the second liquid flow path 212 and the third liquid flow path 213) provided between the light emitting unit 30 and the light receiving unit 40. The optical detection cell 23 is provided along the X-axis of the flow path plate 20 on the bonding surface side of the second plate 202 with the first plate 201. The optical detection cell 23 has a larger cross-sectional area than the second liquid flow path 212 and the third fluid flow path.

The optical detection cell 23 is formed like a rectangle in a planar view. In this embodiment, the second liquid flow path 212 is connected to the −X-axis side of the end surface of the optical detection cell 23 in the −Y-axis direction in the plan view of the flow path plate 20. The third liquid flow path 213 is connected to the +X-axis side of the end surface of the optical detection cell 23 in the −Y-axis direction in the plane view of the flow path plate 20.

A pair of cutouts 24 consists of a first cutout 24A and a second cutout 24B provided opposite to the first cutout 24A. The first cutout 24A and the second cutout 24B are provided facing the X-axis end surface of the flow path plate 20 through the optical detection cell 23.

In this embodiment, the light emitting unit 30 is disposed in the first cutout 24A. A light receiving unit 40 is disposed in the second cutout 24B.

The first cutout 24A and the second cutout 24B have grooves 28A and 28B, respectively, along the Y-axis direction. The grooves 28A, 28B are formed in a generally V-shaped shape.

The flow path plate 20 has an inclined portion 20a formed along the Y-axis direction on the end face side of the principal surface in the +X-axis direction. By providing the inclined portion 20a, the direction of insertion of the flow path plate 20 into the analyzing device 10 can be easily determined. In this embodiment, the flow path plate 20 includes an inclined portion 20a, but may not include an inclined portion 20a.

An example of a method of manufacturing the flow path plate 20 according to the present embodiment will be described. First, on the respective bonding surfaces of the two rectangular plates, recessed portions and holes are formed as the liquid flow path 21, the separation element housing 22, the optical detection cell 23, the pair of cutouts 24, the inlet 25, and the outlet 26 of the flow path plate 20. Thus, the first plate 201 and the second plate 202 are formed. The depressions or holes in the first plate 201 and the second plate 202 may be formed by injection molding, press machining, etc., or by processing with a laser, etc. Next, the first plate 201 and the second plate 202 are superimposed so that the positions of the first plate 201 and the second plate 202 are not misaligned. Thereafter, the first plate 201 and the second plate 202 are bonded together, for example, by thermocompression bonding. This results in the flow path plate 20.

Next, the configuration of the light emitting unit 30, the light receiving unit 40, and the drive unit 50 will be described with reference to FIG. 1.

As illustrated in FIG. 1, the light emitting unit 30 includes a light source 31, a light emitting lens 32, and a light emitting barrel 33. A light source 31 and a light emitting lens 32 are provided in the light emitting barrel 33.

The light source 31 may be, for example, a known light source such as an LED, a tungsten lamp, a laser, or the like.

The light emitting lens 32 collects the light illuminated from the light source 31. For convenience of illustration, the light emitting lens 32 is provided in only one of the light emitting barrels 33 in FIG. 1, but a plurality of light emitting lenses may be provided. The shape and the number of light emitting lenses 32 provided in the light emitting barrel 33 are not particularly limited, but are designed in accordance with the size of the light emitting barrel 33 and the light collecting position.

Figure 8:
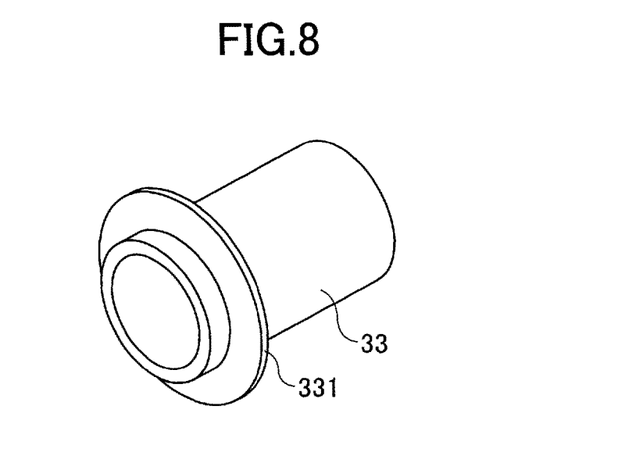
FIG. 8 is a perspective view of a light emitting barrel.
Figure 9:
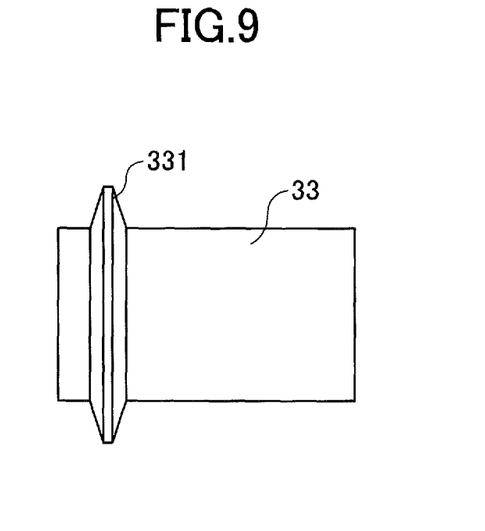
FIG. 9 is a side view of the light emitting barrel.

The light emitting barrel 33 is shaped like a cylinder as illustrated in FIGS. 8 and 9. The light emitting barrel 33 has a protruding portion 331 formed so as to outwardly protrude like a ring around the full circumference of the side surface of the light emitting barrel. The protruding portion 331 is formed so as to narrow towards an outer side and fits into the groove 28A described above.

The light emitting unit 30 is coupled to the control board 35 through the electric wire 34 so as to control the light source 31 and adjust the position of the light emitting lens 32.

The light receiving unit 40 receives light irradiated from the light emitting unit 30. The light receiving unit 40 includes a light receiving unit 41, a light receiving detection unit 42, and a light receiving barrel 43. The light receiving unit 41 and the light receiving detection unit 42 are disposed inside the light receiving barrel 43. In this embodiment, the light receiving unit 40 is provided opposite to the light emitting unit 30 through the optical detection cell 23 (see FIG. 2) so that the optical axis of the light emitting lens 32 and the optical axis of the light receiving unit 41 are aligned substantially on the same linear line.

The light receiving unit 41 collects light that passes through the optical detection cell 23 into the light receiving detection unit 42. Although only one light receiving unit 41 is disposed inside the light receiving barrels 43 in FIG. 1 for convenience of illustration, a plurality of light receiving units 41 may be provided. The shape and the number of light receiving units 41 provided in the light receiving barrel 43 are not particularly limited. The light receiving lens 41 may be designed in accordance with the size of the light receiving barrel 43 and the detection position of the light receiving detection unit 42.

The light receiving detection unit 42 may be a device capable of detecting light, and a known detector may be used. The detection result obtained by the light receiving detection unit 42 is transmitted to the control board 45 through the electric wire 44 and analyzed.

The light receiving barrel 43 may be shaped like a cylinder in a manner similar to the light emitting barrel 33. Like the light emitting barrel 33, the light receiving barrel 43 has a protruding portion 431 formed so as to outwardly protrude like an outer ring around the full circumference of the side surface of the light receiving barrel 43. The protruding portion 431 is formed so as to narrow towards an outer side and fits into the groove 28B as described above. The light receiving unit 40 is connected to the control board 45 through the electric wire 44 and adjusts the position of the light receiving unit 41 or transmits the detection result of the light receiving detection unit 42.

The drive unit 50 moves the light emitting barrel 33 and the light receiving barrel 43 in vertical and horizontal directions. The drive unit 50 has a support pillar 51, a coupling section 52, support section 53A and 53B, and a gear 54.

The support pillars 51 are provided in pairs opposite to each other in the analyzing device 10. A coupling section 52 connects a pair of support pillars 51. The support sections 53A and 53B support the light emitting barrel 33 and the light receiving barrel 43, respectively, so that the light emitting barrel 33 and the light receiving barrel 43 are supported by the coupling section 52 in the horizontal direction. As a moving means in the horizontal direction of the support portions 53A and 53B, a known moving means, such as a roller, may be used. The gear 54 is provided so as to be engaged with teeth (not illustrated) such as a rack provided on the support pillar 51. The gear 54 moves the coupling section 52 up and down by a motor, not illustrated.

Figure 10:
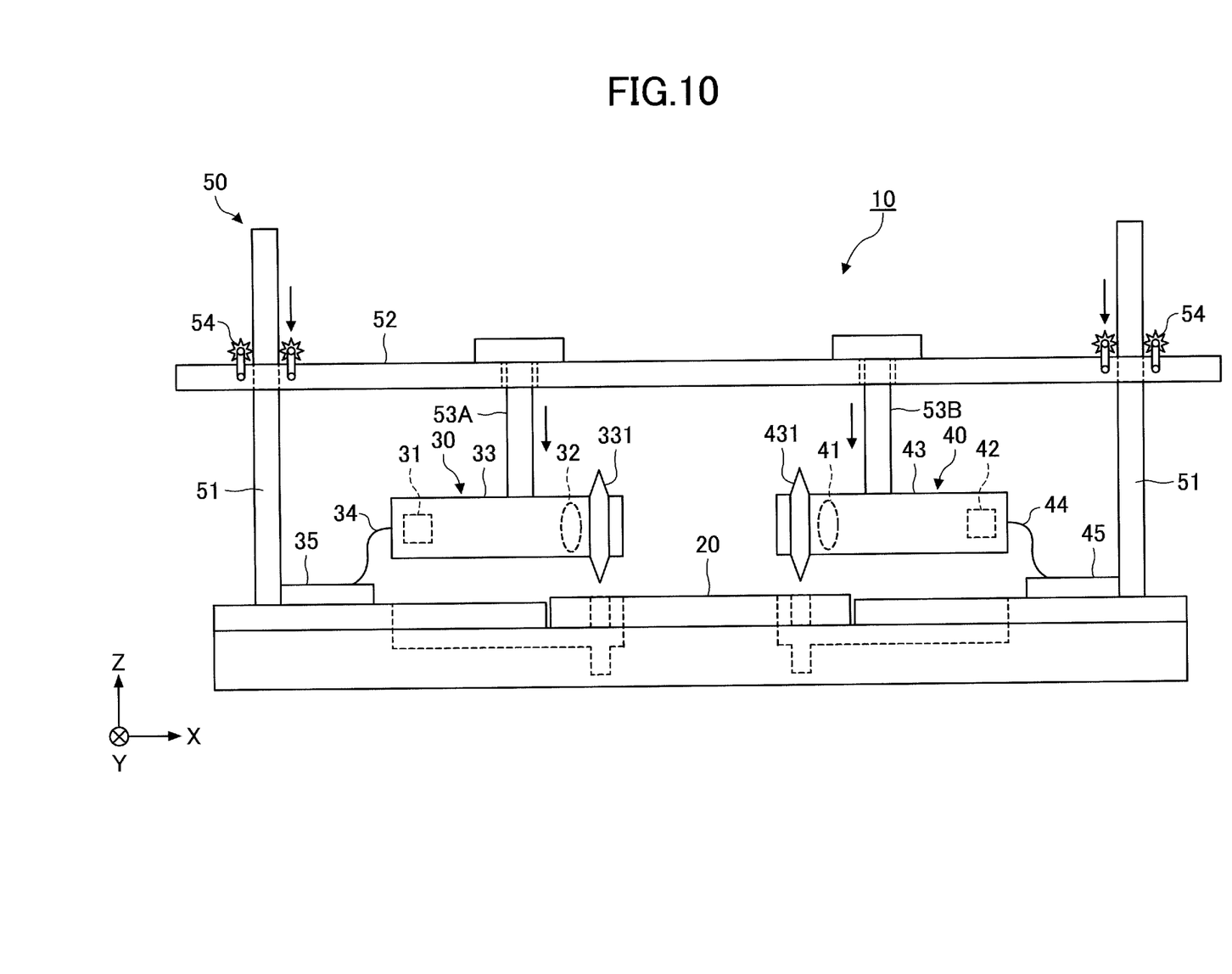
FIG. 10 is a diagram illustrating a state where the light emitting barrel and the light receiving barrel are lowered into a flow path plate.
Figure 11:
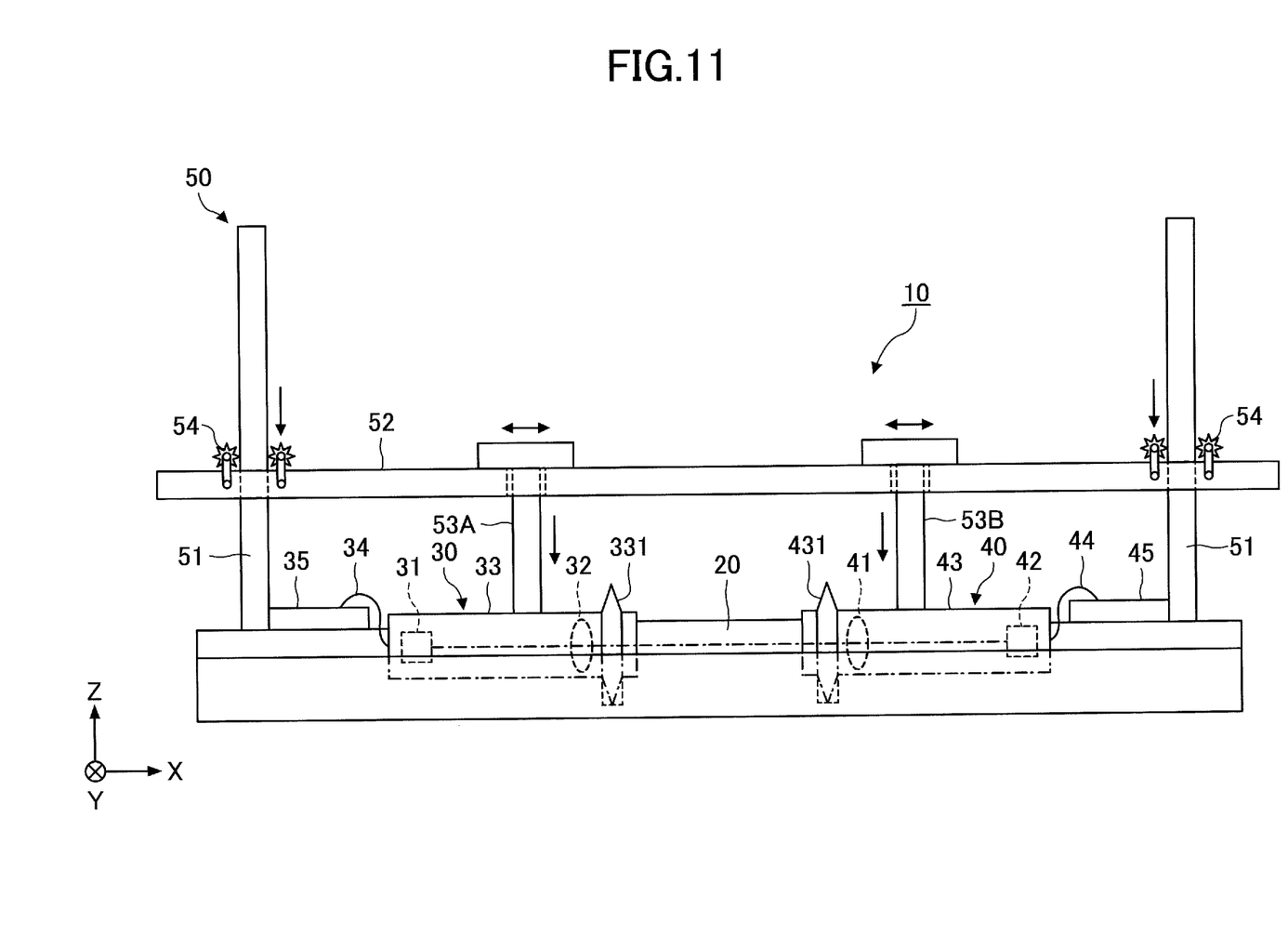
FIG. 11 is a diagram illustrating a state in which the light emitting barrel and the light receiving barrel are mounted on the flow path plate.

An example of a case in which a liquid is analyzed by the analyzing device 10 using the flow path plate 20 will be described. When the flow path plate 20 is inserted into the analyzing device in a +Y direction, the flow path plate 20 is fixed inside the analyzing device 10 as illustrated in FIG. 1. Thereafter, as illustrated in FIG. 10, the gear 54 is driven so that the coupling section 52 is lowered. Thus, the light emitting barrel 33 and the light receiving barrel 43, which are supported on the support sections 53A and 53B, are disposed in the first and second cutouts 24A and 24B of the flow path plate 20, as illustrated in FIG. 11.

Figure 12:
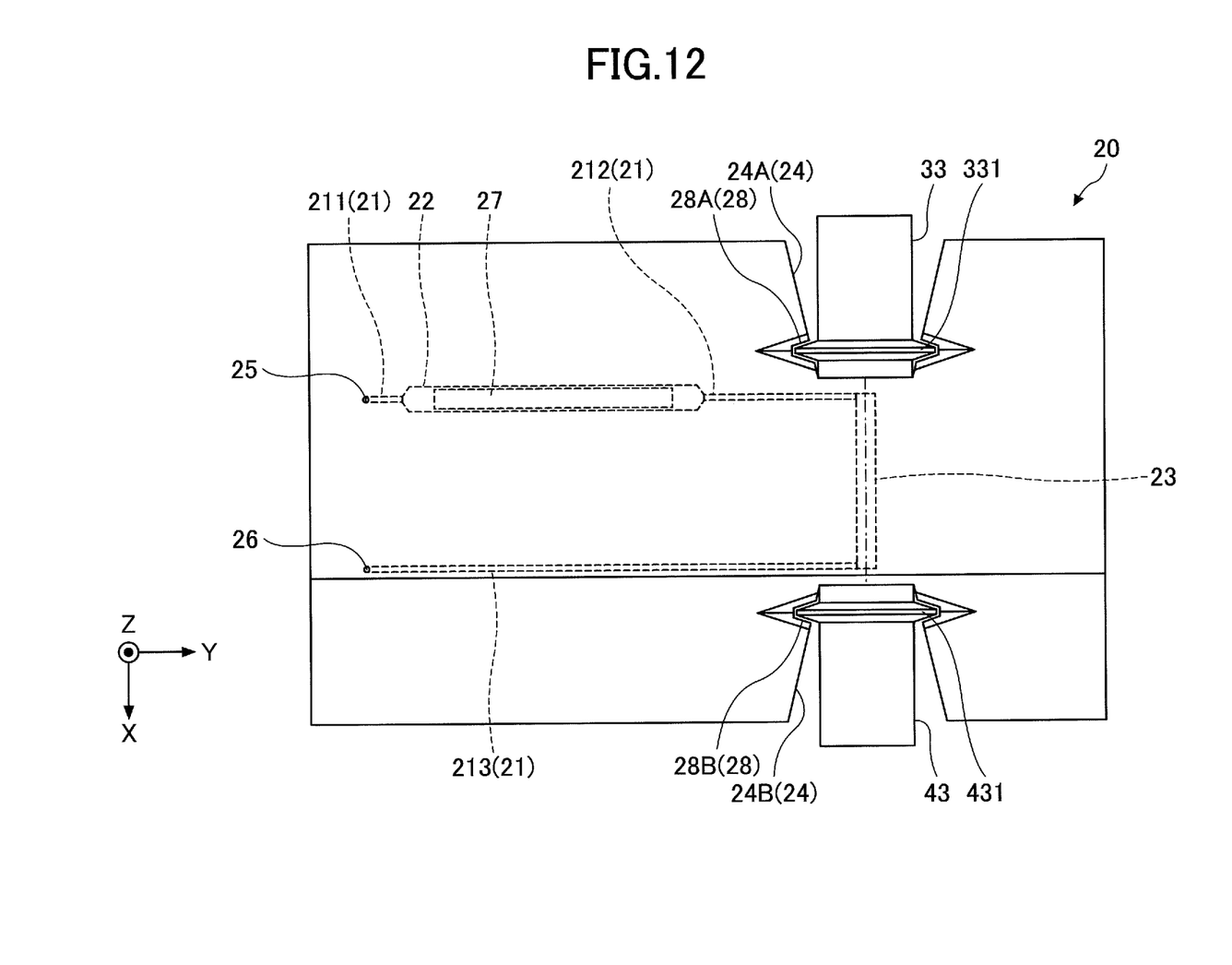
FIG. 12 is a plan view of the flow path plate illustrating a state where the light emitting barrel and the light receiving barrel are installed.

Thereafter, the support sections 53A and 53B are moved in the horizontal direction to adjust the position of the light emitting barrel 33 and the light receiving barrel 43. Thus, as illustrated in FIG. 12, the light emitting barrel 33 and the light receiving barrel 43 are suitably fitted into the first cutout 24A and the second cutout 24B of the flow path plate 20.

Then, a supply tube is inserted into the inlet 25 for supplying a liquid (not illustrated), a drain tube is inserted into the outlet 26 for draining a liquid (not illustrated), and the liquid is injected from the supply tube into the inlet 25. The light is irradiated from the light emitting unit 30 toward the light receiving unit 40. The liquid is supplied from the inlet 25 through the first liquid flow path 211 to the separation element housing 22. The components in the liquid are separated by a separation column 27 in the separation element housing 22. The liquid from which the components are separated by the separation column 27 is then fed through the second liquid flow path 212 to the optical detection cell 23. Light from the light emitting unit 30 is irradiated into the liquid supplied to the optical detection cell 23 so as to be converged inside the optical detection cell 23. The light irradiating the inside of the optical detection cell 23 may cause scattered light as the light passes through the liquid within the optical detection cell 23. The scattered light caused in the optical detection cell 23 is converged by the light receiving unit 41 of the light receiving unit 40 and is detected by the light receiving detection unit 42. The detection result of the scattered light detected by the light receiving detection unit 42 is transmitted to the control board 45, and the liquid passing through the optical detection cell 23 of the flow path plate 20 is analyzed. The liquid in the optical detection cell 23 is also drained from the inside of the optical detection cell 23 through the third liquid flow path 213 out of the outlet 26.

Thus, the analyzing device 10 according to the embodiment performs a liquid analysis using the flow path plate 20. Because the flow path plate 20 has the first cutout 24A and the second cutout 24B, the positioning of the light emitting barrel 33 and the light receiving barrel 43 on the flow path plate 20 can be facilitated by simply placing the light emitting barrel 33 and the light receiving barrel 43 in the first cutout 24A and the second cutout 24B. Accordingly, it is possible to easily adjust the position of the flow path plate 20, the light emitting unit 30, and the light receiving unit 40 so that the optical axis of the light irradiated from the light emitting unit 30 passes through the optical detection cell 23. Therefore, according to the analyzing device 10, it is possible to easily and accurately perform the position adjustment of the optical axis of the light irradiated from the light emitting unit 30. Accordingly, the analyzing device 10 may easily and accurately analyze the liquid in a short time.

According to this embodiment, the light emitting barrel 33 and the light receiving barrel 43 have protruding portions 331 and 431 on their side, and the first cutouts 24A and 24B of the flow path plate 20 have grooves 28A and 28B, respectively. The grooves 28A and 28B are formed to correspond to the protruding portions 331 and 431. Therefore, when the light emitting barrel 33 and the light receiving barrel 43 are installed in the first cutout 24A and the second cutout 24B, the positioning of the light emitting barrel 33 and the light receiving barrel 43 to the first cutout 24A and the second cutout 24B can be easily and accurately performed.

According to this embodiment, the flow path plate 20 has an optical detection cell 23 in a portion of the flow path between the light emitting unit 30 and the light receiving unit 40 (between the second liquid flow path 212 and the third liquid flow path 213). Therefore, when the flow path plate 20 is replaced, the optical detection cell 23 is also replaced at the same time. Conventional analyzing devices have used flow cells to analyze a liquid to be analyzed. Because various types of specimens as liquids path through the flow cell, it is necessary to thoroughly wash the inside of the flow cell in advance with a wash solution or the like each time the liquid is analyzed to avoid any effect on the analysis of the liquid. In contrast, according to this embodiment, because the optical detection cell 23 is provided in the flow path plate 20, the optical detection cell 23 is replaced with the flow path plate 20. Therefore, when the flow path plate 20 is used, the optical detection cell 23 can be used in a clean state, so that the precision of analysis of the liquid in the optical detection cell 23 can be stably maintained.

According to the present embodiment, the separation element housing 22 is provided in the flow path plate 20 at an upstream side of the liquid flowing through the liquid flow path 21 from the optical detection cell 23, and the separation column 27 is housed in the separation element housing 22. Accordingly, the exchange of the flow path plate 20 can be performed at the same time as the exchange of the separation column 27 as well as the optical detection cell 23. Accordingly, maintenance and inspection of the analyzing device 10 can be easily performed.

According to this embodiment, the light emitting unit 30 and the light receiving unit 40 are disposed to be opposite to each other so that the optical axis of the light emitting lens 32 and the optical axis of the light receiving unit 41 are substantially aligned along the same straight line. The optical detection cell 23 of the flow path plate 20 is positioned so as to be substantially aligned along the same straight line. Therefore, by using a large size flow path plate 20, even when the distance between the light emitting lens 32 and the light receiving unit 41 is great, the optical axis can be stably matched with high accuracy.

According to this embodiment, the optical detection cell 23 is formed in the second plate 202 of the flow path plate 20. Therefore, it is possible to suppress the light emitted from the light emitting unit 30 from passing through the boundary portion between the first plate 201 and the second plate 202. Therefore, because it is possible to suppress the light irradiated by the light emitting unit 30 from scattering at the boundary portion, it is possible to reduce the occurrence of detection error in the light receiving unit 40.

According to this embodiment, the liquid flow path 21 is shaped substantially like U in the plane view of the flow path plate 20 from the inlet 25 to the outlet 26 through the separation element housing 22 and the optical detection cell 23. In the flow path plate 20, the liquid inflow into and effluent from the flow path plate 20 occurs at the end face of the flow path plate 20 in the -Y-axis direction, and the liquid can flow substantially in U-shape in a plane view of the flow path plate 20 into the flow path plate 20. Accordingly, because the location where the optical detection cell 23 is installed in the flow path plate 20 may be maintained to be wide, the size of the optical detection cell 23 and the location where the optical detection cell 23 is installed in the flow path plate 20 may be easily designed. Accordingly, because the optical axis of the light irradiated from the light emitting unit 30 can be extended by designing the optical detection cell 23 to a larger size, the positional adjustment of the optical axis can be simplified.

According to the present embodiment, the optical detection cell 23 is disposed between the second liquid flow path 212 and the third liquid flow path 213. Therefore, because the liquid in the optical detection cell 23 is flown into the optical detection cell 23 from the second liquid flow path 212 while the liquid inside the optical detection cell 23 is flown into the third liquid flow path 213, the liquid in the optical detection cell 23 can be continuously measured while the liquid is flown into the optical detection cell 23.

According to this embodiment, in the liquid flow path 21, the recessed portion of the first plate 201 and the recessed portion of the second plate 202 are symmetrically formed with respect to the center line of the recessed portions. Therefore, because the liquid can flow stably in the liquid flow path 21, it is possible to suppress the turbulence in the liquid flow path 21.

As described above, the analyzing device 10 of this embodiment can easily and accurately analyze blood components such as proteins and nucleic acids contained in blood, chemical substances contained in wastewater discharged from factories, and trace substances such as components contained in groundwater in a short time. Therefore, the analyzing device 10 can be suitably used in medical practice, such as clinical testing, food testing, environmental testing, medical and nursing practice. In particular, it can be used effectively for POCT.

In this embodiment, the flow path plate 20 is formed in a rectangular shape in a plan view. However, the shape of the flow path plate 20 is not limited thereto, and may have other shapes, such as a circular shape.

Only one separation element housing 22 is provided to the flow path plate 20 but may be provided in series or parallel. At this time, the number of the separation columns 27 provided in the flow path plate 20 may be one or more depending on the number of separation element housings 22. In this embodiment, the optical detection cell 23 is formed in the second plate 202, but is not limited thereto, and may be formed in the first plate 201.

In this embodiment, the light emitting unit 30 is disposed in the first cutout 24A, and the light receiving unit 40 is disposed in the second cutout 24B. However, it is sufficient the light emitted from the light emitting unit 30 may path through the optical detection cell 23. The light receiving unit 40 may be disposed in the first cutout 24A, and the light emitting unit 30 may be disposed in the second cutout 24B.

In this embodiment, the outlet 26 is provided in the vicinity of the inlet 25, but the position of the outlet 26 is not limited thereto and may not be near the inlet 25. For example, the outlet 26 may be provided on the principal surface of the flow path plate 20 corresponding to a position immediately after the third liquid flow path 213 extends from the optical detection cell 23 in a longitudinal direction (-Y axis direction) of the flow path plate 20.

In this embodiment, the pressure regulator 272 of the separation column 27 is provided at both the entry end 271a and the exit end 271b of the stationary phase 271, but may be provided at either end, or may not be provided at all.

In this embodiment, the separation columns 27 include, but are not limited thereto. The coating 273 may not be provided, such as when the stationary phase 271 alone can be disposed while clamping the separation column 27 to the separation element housing 22.

In this embodiment, the protruding portions 331 and 431 are provided on the entire circumference of the side surfaces of the light emitting barrel 33 and the light receiving barrel 43, but are not limited thereto. If the protruding portions 331 and 431 fit the grooves 28A and 28B of the first cutout 24A and the second cutout 24B, the protruding portion 331 and 431 may be formed only on a portion of the sides of the light emitting barrel 33 and the light receiving barrel 43.

In this embodiment, the protruding portions 331 and 431 are formed so as to narrow as they go outward, but may be the same width.

In this embodiment, the light emitting unit 30 and the light receiving unit 40 have the light emitting barrel 33 and the light receiving barrel 43 having the protruding portions 331 and 431 on their side, respectively, but the protruding portions 331 and 431 may not be provided. Further, the protruding portions 331 and 431 may be provided on only one of the two. At this time, if the protruding portions 331 and 431 are not provided in the light emitting barrel 33 and the light receiving barrel 43, the grooves 28A and 28B may not be provided in the first cutout 24A and the second cutout 24B. If only one of the protruding portions 331 and 431 is provided, one of the grooves 28A and 28B is provided depending on the protruding portion.

The analyzing device according to one aspect of the present invention can easily and accurately adjust the position of the optical axis of the light illuminated by the optical component.

Although the embodiments have been described above, the embodiments are presented by way of example and the invention is not limited by the embodiments. The embodiments may be implemented in various other forms, and various combinations, omissions, substitutions, modifications, etc., may be made without departing from the spirit of the invention. These embodiments and modifications thereof are included in the scope and gist of the invention and are included in the scope of the invention and equivalents thereto.

DESCRIPTION OF SYMBOLS

10: Analyzing device
20: Flow path plate
201: First plate
202: Second plate
21: Liquid flow path (flow path)
211: First liquid flow path
212: Second liquid flow path
213: Third liquid flow path
22: Separation element housing
23: Optical detection cell
24: Cutout
24A: First cutout
24B: Second cutout
27: Separation column (separation element)
28A, 28B: Groove
30: light emitting unit
32: Light emitting lens
33: Light emitting barrel
331, 431: Protruding portion
40: Light receiving unit
41: Light receiving lens
43: Light receiving barrel
50: Drive unit

What is claimed is:

1. An analyzing device comprising:
a flow path plate having a flow path, through which a liquid flows, shaped like a rectangle, and having a light permeability;
a light emitting unit having a light emitting lens and emitting light; and
a light receiving unit including a light receiving lens and receiving the light,
wherein the analyzing device analyzes the liquid flowing inside the flow path plate,
wherein the flow path plate includes a pair of cutouts respectively formed at end faces of the flow path plate, the end faces facing each other through a part of the flow path,
wherein the pair of cutouts includes a first cutout in which the light emitting unit is disposed and a second cutout in which the light receiving unit is disposed,
wherein the flow path plate includes a separation column housing in the flow path that is present on an upstream side of the flow path through which the light passes, and
wherein a separation column for chromatography is disposed inside the separation column housing.

2. The analyzing device according to claim 1,
wherein the light emitting unit includes a light emitting barrel,
wherein the light receiving unit includes a light receiving barrel,
wherein the light emitting barrel and the light receiving barrel have protruding portions that outwardly protruding from side surfaces of the light emitting barrel and the light receiving barrel, respectively, and
wherein the first and second cutouts have grooves corresponding to shapes of the protruding portions, respectively.

3. The analyzing device according to claim 1,
wherein the light emitting unit and the light receiving unit are disposed to face each other so that an optical axis of the light emitting lens and an optical axis of the light receiving lens are on a same straight line,
wherein the analyzing device further comprises:
an optical detection cell formed in a part of the flow path provided between the light emitting unit and the light receiving unit so as to form a space that has a cross-sectional area greater than that of the flow path and extends along the flow path.

4. The analyzing device according to claim 3,
wherein the flow path plate includes two plate-like plates, and
wherein the optical detection cell is formed on one of the two plate-like plates.

5. The analyzing device according to claim 4,
wherein the flow path is shaped like U through the optical detection cell in a middle of the flow path in a plan view of the flow path plate.

6. The analyzing device according to claim 1,
wherein the flow path plate has a separation element housing in a flow path that is on an upstream side of the flow path through which the light passes,
wherein a separation element is provided in the separation element housing.

7. A flow path plate shaped like a rectangle and having a light permeability, the flow path plate comprising:
a flow path through which a liquid passes;
an optical detection cell disposed at a part of the flow path along the flow path and formed of a space having a cross-sectional area greater than that of the flow path; and
a pair of cutouts respectively formed at end faces of the flow path plate, the end faces facing each other through the part of the flow path,
wherein the flow path plate has a pair of cutouts respectively formed at an end face so as to face end faces of the flow path plate, the end faces facing each other through a part of the flow path,
wherein the pair of cutouts is a first cutout in which a light emitting unit of emitting light is disposed and a second cutout in which a light receiving unit of receiving the light is disposed,
wherein the flow path plate includes a separation column housing in the flow path that is present on an upstream side of the flow path through which the light passes, and wherein a separation column for chromatography is disposed inside the separation column housing.

* * * * *